WADE & KAYE.
Car Wheel.
No. 29,927. Patented Sept. 4, 1860.
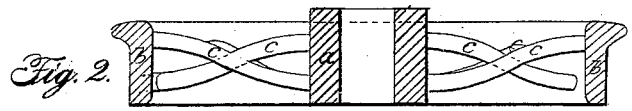
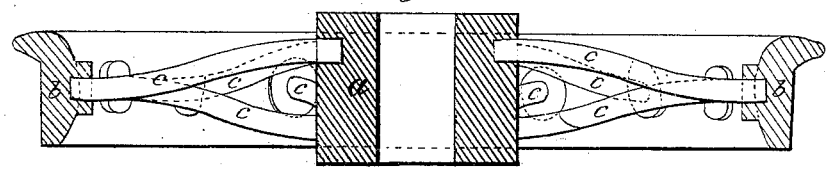
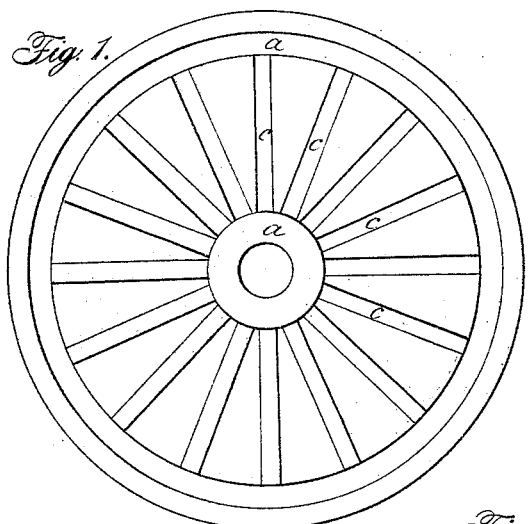
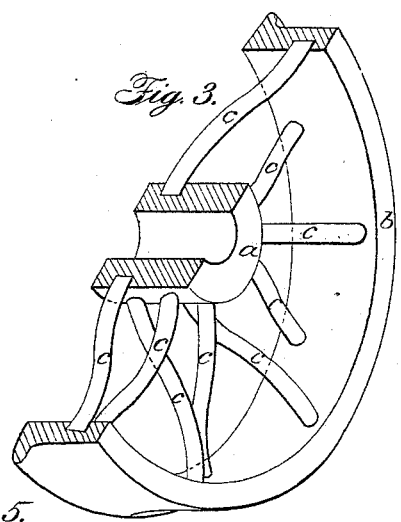
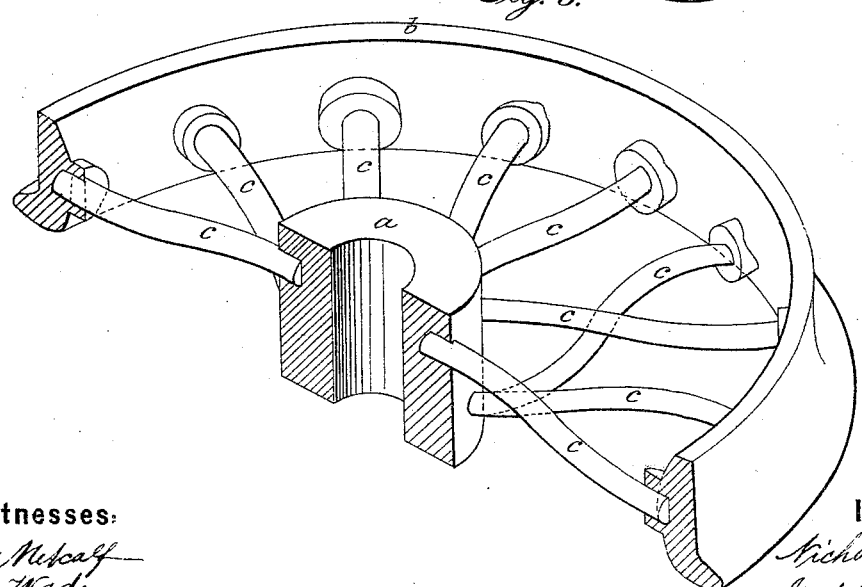
Witnesses:
Wm. T. Metcalf
W. Wade
Inventor:
Nicholas K. Wade
Joseph Kaye

UNITED STATES PATENT OFFICE.

NICHOLAS K. WADE AND JOSEPH KAYE, OF PITTSBURG, PENNSYLVANIA.

CAR-WHEEL.

Specification of Letters Patent No. 29,927, dated September 4, 1860.

*To all whom it may concern:*

Be it known that we, NICHOLAS K. WADE and JOSEPH KAYE, of Pittsburg, in the county of Allegheny and State of Pennsylvania, have invented a new and Improved Method of Arranging Spokes or Arms of Wrought-Iron or other Flexible Material in Cast Car-Wheels, Pulleys, &c.; and we do hereby declare that the following is a full and exact description thereof, reference being had to the accompanying drawings, and to the letters of reference marked thereon.

The nature of our invention consists in making the arms above referred to of a curved form, either a single or double curvature as may be deemed expedient, so that they yield to the strain caused by the contraction of the rim and also so arranging them that they may brace the rim and hub in a plane parallel to the axle. This arrangement also admits of the rim and hub being cast at the same time, which has not been attainable by any other method.

To enable others skilled in the art to make and use our invention, we thus describe it.

It is represented in the accompanying drawings of car wheels, whereof—

Figure 1 is a plan, Figs. 2 and 4 transverse sections, and Figs. 3 and 5 views in isometrical perspective.

The arms in the drawing marked $c$ are made of a double curvature so that if the hub "$a$" of the wheel solidifies first the contraction of the rim "$b$" will not strain itself but impart a greater curvature to the arms, or if the rim cool first, the contraction of the hub will straighten the arms, the material used being the same, such as wrought iron, which will yield to such flexure. This curvature can be in the plane of the axis or at right angles to it as may be desired.

We insert the arms "$c$" alternately at the bottom and top of the hub "$a$" as shown in all the figures, but the arms may enter the rim "$b$" at differing planes, as shown in Figs. 1, 2 and 3, where the arm which enters the hub at the bottom enters the rim at the top and so alternately, vice versa, or the arms may all enter the rim in the same plane as shown in Figs. 4 and 5.

We do not claim the use of wrought iron arms, or spokes, for wheels, pulleys, &c., nor do we claim the bracing of such pieces by diverging straight arms of wrought iron; but What we do claim as our invention and desire to secure by Letters Patent is—

The use of arms or spokes of wrought iron or other flexible material, of single or double curvature and so placed on the hub and rim as to afford a lateral brace substantially as set forth and shown in the accompanying drawings.

NICHOLAS K. WADE.
    JOSEPH KAYE.

Witnesses:
 W. WADE,
 WM. METCALF.